United States Patent
Kobayashi

(10) Patent No.: US 8,521,211 B2
(45) Date of Patent: Aug. 27, 2013

(54) COMMUNICATION SYSTEM, COMMUNICATION STATION, COMMUNICATION TERMINAL, AND METHOD OF COMMUNICATION

(75) Inventor: Takaharu Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 13/025,519

(22) Filed: Feb. 11, 2011

(65) Prior Publication Data

US 2011/0230135 A1    Sep. 22, 2011

(30) Foreign Application Priority Data

Mar. 17, 2010 (JP) .................. 2010-061602

(51) Int. Cl.
- *H04B 7/00* (2006.01)
- *H04B 1/38* (2006.01)
- *H04W 36/00* (2009.01)
- *H04W 72/00* (2009.01)

(52) U.S. Cl.
USPC ........... 455/522; 455/436; 455/450; 455/500; 455/501; 455/502; 455/73; 455/526

(58) Field of Classification Search
USPC ................... 455/73, 436, 450, 500–502, 522, 455/526
See application file for complete search history.

(56) References Cited

U.S. PATENT DOCUMENTS

| | | | |
|---|---|---|---|
| 7,869,463 B2* | 1/2011 | Shiizaki et al. | 370/498 |
| 2007/0060167 A1* | 3/2007 | Damnjanovic et al. | 455/450 |
| 2008/0062857 A1 | 3/2008 | Monogioudis et al. | |
| 2008/0137689 A1 | 6/2008 | Shiizaki et al. | |
| 2010/0046374 A1* | 2/2010 | Ludwig et al. | 370/236 |
| 2010/0075703 A1 | 3/2010 | Imai et al. | |
| 2011/0117949 A1 | 5/2011 | Joko | |

FOREIGN PATENT DOCUMENTS

| | | |
|---|---|---|
| JP | 2008-300995 | 12/2008 |
| JP | 2009-515372 | 4/2009 |
| JP | 2009-290619 | 12/2009 |
| WO | 2007/007383 | 1/2007 |
| WO | 2007123366 | 11/2007 |
| WO | 2008/093619 A1 | 8/2008 |

OTHER PUBLICATIONS

European Search Report dated Jul. 4, 2011, from corresponding European Application No. 11 15 4937.
Notice of Reasons for Rejection dated May 14, 2013, from the corresponding Japanese Patent Application No. 2010-061602 with English-language translation.

* cited by examiner

*Primary Examiner* — Yuwen Pan
*Assistant Examiner* — Xin Jia
(74) *Attorney, Agent, or Firm* — Katten Muchin Rosenman LLP

(57) ABSTRACT

Upon receipt of a request for retransmission issued from a first terminal, the base station generates a synthesized data by combining retransmission data destined for the first terminal and data destined for a second terminal and transmits the synthesized data, using a single communication resource.

13 Claims, 11 Drawing Sheets

COMMUNICATION SYSTEM, COMMUNICATION STATION, COMMUNICATION TERMINAL, AND METHOD OF COMMUNICATION

CROSS-REFERENCE TO RELATED APPLICATION

This application is based upon and claims the benefit of priority of the prior Japanese Application No. 2010-061602 filed on Mar. 17, 2010 in Japan, the entire contents of which are hereby incorporated by reference.

FIELD

The embodiment discussed herein is a communication system, a communication station, a communication terminal, and a method of communication.

BACKGROUND

Communication systems currently put into practice gives high importance to a technique of compensating for data errors occurring on a transmission path between a transmitter and a receiver, which technique is exemplified by Automatic Repeat request (ARQ).

In the scheme of ARQ, a receiver that receives data (e.g. packets) detects the presence or the absence of an error in the data received from a transmitter through the use of an error detection code, such as a CRC (Cyclic Redundancy Check) code, attached to the received data.

As a result of the detection, if no error is detected in the received data, the receiver returns an ACK (ACKnowledgement) signal to the transmitter to thereby request the transmitter to transmit next new data to the receiver.

On the other hand, if an error is detected in the received data, the receiver returns a NACK (Negative ACKnowledgement) signal to the transmitter to thereby request the transmitter to retransmit retransmission data to the receiver.

This reduces the influence caused by error in data on the transmission path, realizing highly reliable data transmission.

However, in some cases of the ARQ scheme, data retransmission is repeated. One of the solutions to limit the number of times of retransmitting data is HARQ (Hybrid ARQ) scheme.

As illustrated in FIG. 1, in the HARQ scheme, the transmitter (e.g., abase station) first transmits new data (e.g., data destined for a terminal) to the receiver (e.g., a terminal) (step S100). The receiver receives the data (step S101) and detects the presence or the absence of an error in the received data (step S102).

As a result of the error detection, an error is detected in the received data, the receiver transmits a NACK signal to the transmitter (step S104) and retains the received data (step S103).

Next, upon receipt of the NACK signal from the receiver, the transmitter transmits retransmission data corresponding to (e.g., the same as) data transmitted for the last time to the receiver (step S105).

Upon receipt of the retransmission data from the transmitter (step S106), the receiver synthesizes the previously-received data stored in the receiver and the retransmitted data and decodes the synthesized data (step S107). Examples of synthesis in the HARQ technique are Chase Combining, and IR (Incremental Redundancy) Combining.

Then, the receiver detects the presence or the absence of an error in the decoded data (step S108) and transmits an ACK or NACK signal to the transmitter (step S109) in accordance with the result of the error detection.

As the above, in the HARQ scheme, the receiver synthesizes (retransmission synthesis) data previously received and retransmission data and decodes the synthesized data, so that the SIR (Signal-to-Interference Ratio) of the data can be improved, realizing good reception characteristics.

Consequently, HARQ can limit the number of times of retransmitting data.

In one of known techniques, a transmitter forcibly retransmits the same packet to a receiver before the RTT (Round Trip Time) after transmission of the same packet expires and concurrently irrespective of the response of the reception of the packet from the receiver (Patent Document 1).

[Patent Document 1] WO 2007/007383

In a communication system adopting the ARQ or HARQ scheme, when the transmitter transmits retransmission data to the receiver, the transmitter ensures communication resource (e.g. time, frequency, code, and hardware such as antenna) for the data retransmission.

Ensuring of communication resource for retransmission data may cause a lack of communication resource to transmit data (e.g., new data destined for a different terminal from one requesting the retransmission data) except for such retransmission data.

Consequently, there is a possibility of lowering efficiency in using communication resource.

SUMMARY (1) According to an aspect of the embodiments, a system includes a communication system including: a communication station that transmits data; and a plurality of communication terminals each of which receives the data from the communication station and is capable of sending the communication station a request for retransmitting the data, the communication station including a synthesizer that, if the communication station receives the request from a first communication terminal that is one of the plurality of communication terminals, synthesizes retransmission data destined for the first communication terminal and data destined for a second communication terminal that is another one of the plurality of communication terminals to thereby create synthesized data, and a transmitter that transmits the synthesized data created by the synthesizer using a single communication resource, each of the plurality of communication terminals including a memory that stores the data for which the request is sent, and a decoder that receives the synthesized data from the communication station and decodes data desired by the communication terminal from the synthesized data and the data stored in the memory.

(2) According to an aspect of the embodiments, an apparatus includes a communication station used in a communication system including the communication station that transmits data and a plurality of communication terminals each of which receives the data from the communication station and is capable of sending the communication station a request for retransmitting the data, the communication station including: a synthesizer that, if the communication station receives the request from a first communication terminal that is one of the plurality of communication terminals, synthesizes retransmission data destined for the first communication terminal and data destined for a second communication terminal that is another one of the plurality of communication terminals to thereby create synthesized data, and a transmitter that transmits the synthesized data created by the synthesizer using a single communication resource.

(3) According to an aspect of the embodiments, an apparatus includes a communication terminal used in a communication system including a communication station that transmits data and a plurality of the communication terminals each of which receives the data from the communication station and is capable of sending the communication station a request for retransmitting the data, the communication terminal including: a memory that stores the data for which the request is sent, a decoder that receives, from the communication station, synthesized data created by the communication station through synthesizing retransmission data destined for a first communication terminal that is one of the plurality of communication terminals and data destined for a second communication terminal that is another one of the plurality of communication terminal and decodes data desired by the communication terminal from the synthesized data and the data stored in the memory.

(4) According to an aspect of the embodiments, a method includes a method for communication in a communication system including a communication station that transmits data; and a plurality of communication terminals each of which receives the data from the communication station and is capable of sending the communications station a request for retransmitting the data, the method including: upon receipt of the request from a first communication terminal that is one of the plurality of communication terminals, synthesizing retransmission data destined for the first communication terminal and data destined for a second communication terminal that is another one of the plurality of communication terminals to thereby create synthesized data; and transmitting the synthesized data using a single communication resource.

(5) According to an aspect of the embodiments, a method includes a method for communication in a communication system including a communication station that transmits data; and a plurality of communication terminals each of which receives the data from the communication station and is capable of sending the communication station a request for retransmitting the data, the method including: storing the data for which the request is sent; receiving synthesized data created by the communication station through synthesizing retransmission data destined for the first communication terminal that is one of the plurality of the communication terminals and data destined for a second communication terminal that is another one of the plurality of communication terminals; and decoding data desired by the communication terminal from the synthesized data and the data stored in the memory.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations maybe made to the embodiments (for example, by combining the exemplary embodiments) without departing from the scope and spirit of the proposed method and/or apparatus.

Figure 1:
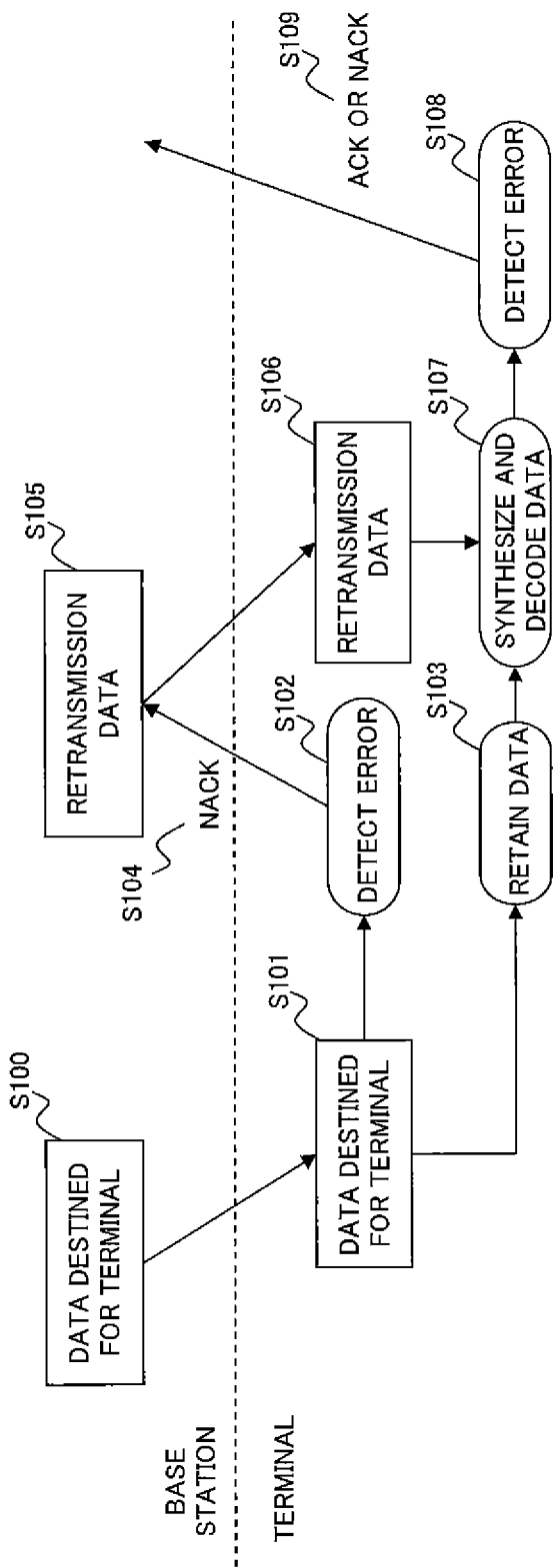
FIG. 1 is a diagram illustrating an example of HARQ.
Figure 2:
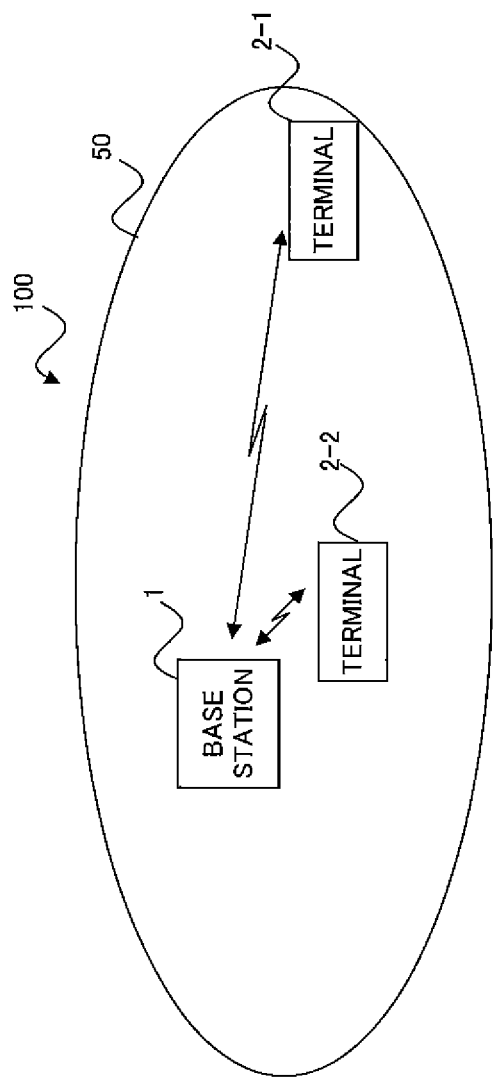
FIG. 2 is a diagram illustrating an example of a communication system according to a first embodiment of the present invention.

(1) First Embodiment (1.1) Example of the Configuration of a Communication System:

FIG. 2 is a diagram illustrating an example of a communication system according to a first embodiment.

A communication system 100 illustrated in FIG. 2 exemplarily includes a base station 1 and a number of terminals 2-1 and 2-2. Hereinafter, the terminal is simply represented by a reference number 2 if there is no requirement of discriminating terminals 2-1 and 2-2 from each other. The number of base stations 1 and that of terminals 2-1 and 2-2 are not limited to those illustrated in FIG. 2.

Here, the base station 1 provides a wireless area 50 in the form of, for example, a cell or a sector. The base station 1 can wirelessly communicates with each terminal 2 in the wireless area 50, and therefore function as an example of a communication station that transmits data (to terminals 2) in the first embodiment.

In the meantime, each terminal 2 wirelessly communicates with the base station 1 in the wireless area 50 that the base station 1 provides. Furthermore, the terminal 2 can wirelessly communicates with another base station 1 and another terminal 2 through the base station 1. Namely, each terminal 2 of the first embodiment functions as an example of a communication terminal that receives data from the base station 1 and that is capable of requesting the base station 1 to retransmit the same data.

In addition, each terminal 2 is capable of wireless communication with two or more base stations 1 and handover processing in a region at which the wireless area 50 of the base station 1 overlaps with one or more wireless areas of other base stations.

Each terminal 2 is capable of measuring reception quality of the own terminal 2 by, for example, using a reference signal (e.g., a pilot signal) received from the base station 1. The information (reception quality information) regarding the reception quality is notified to the base station 1 by the terminal 2. The reception quality information is exemplified by a CIR (Carrier to Interference Ratio) or a CQI (Channel Quality Indicator).

Upon receipt of the reception quality information from the terminal 2, the base station 1 determines a transmission rate (MCS (Modulation Coding Scheme)) containing a decoding rate, a modulation scheme, a transmission electric power according to the reception quality of each terminal 2 and transmits data to the terminal 2 at the determined transmission rate.

Thereby, the base station 1 can transmit data to respective terminals 2, efficiently using the communication resource (e.g., time, frequency, code and antenna) for data transmission.

Upon receipt of data from the base station 1, the terminal 2 detects the presence or the absence of an error in the received data by using an error detection code, such as a CRC code, attached to the received data.

If the detection finds no error in the received data, the terminal 2 returns an ACK signal to the base station 1 and thereby requests the base station 1 to transmit next new data to the terminal 2 while if the detection fines one or more errors in the received data, the terminal returns a NACK signal to the base station 1 and thereby requests the base station 1 to retransmit the same received data (retransmission data) to the terminal 2.

In the first embodiment, the communication system 100 carries out the following data communication.

Figure 3:
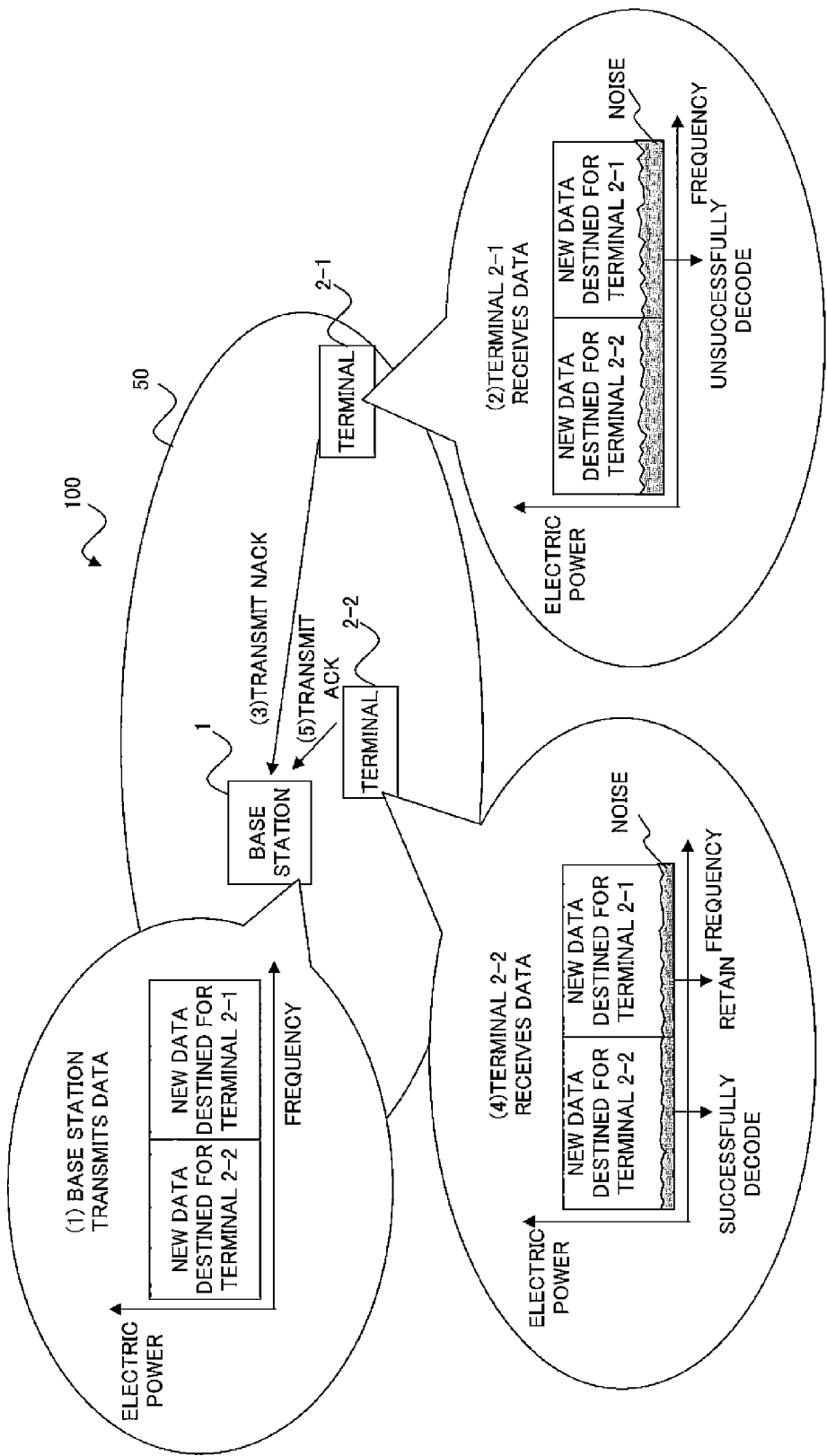
FIGS. 3 and 4 are diagrams illustrating an example of operation of the communication system of FIG. 2.

Specifically, as illustrated in FIG. 3, the base station 1 first transmits a wireless frame including new data destined for the terminal 2-1 and new data destined for the terminal 2-2 to the terminals 2 (see (1) in FIG. 3). A wireless frame is transmitted through the use of a predetermined communication resource defined in terms of, for example, a transmission electric power and a frequency domain. The communication resource may be a wireless resource. It is sufficient that the wireless frame includes new data destined for the terminal 2-1.

Then the terminal 2-1 receives the wireless frame from the base station 1; demodulates (extracts) the new data destined for the own terminal 2-1 on the basis of control information (e.g., mapping information) included in the received wireless frame; and attempts to detect an error in the demodulated new data and decode the data.

If an error is detected in the new data destined for the own terminal 2-1 and the data is consequently unsuccessfully decoded (see (2) in FIG. 3), the terminal 2-1 retains the received new data and transmits a NACK signal to the base station 1 to thereby request retransmission of the same new data (see (3) in FIG. 3).

In the communication system 100 illustrated in FIG. 2, the terminal 2-2 is positioned in the vicinity of the base station 1 while the terminal 2-1 is positioned within and in the vicinity of the boundary of the wireless area 50. With this positioning, a propagation loss in a transmission path between the base station 1 and the terminal 2-1 is larger than that in a transmission path between the base station 1 and terminal 2-2. Accordingly, assuming the terminal 2-1 and terminal 2-2 transmit and receive signals having the same level, a signal received by the terminal 2-1 has a higher ratio of a noise signal (noise) than that of a signal received by the terminal 2-2. Here, the base station 1 controls allocation of data, adopting a coding scheme, a modulation scheme, transmission electric power and scheduling, having a higher error tolerance than those adopted to data destined for the terminal 2-2, to data destined for the terminal 2-1, for example. Noise is generated in accordance with, for example, a propagation loss in a transmission path, and specifically depends on propagation environment such as the distance between the base station 1 and each terminal 2 and a number of terminals concurrently accommodated in the wireless area 50 of the base station 1.

In the meantime, the terminal 2-2 receives the wireless frame from the base station 1; demodulates (extracts) the new data destined for the terminal 2-2 on the basis of control information included in the received wireless frame; and attempts to detect an error in the demodulated new data and decode the data.

If no error is detected in the new data destined for the own terminal 2-2 and the data is successfully decoded (see (4) in FIG. 3), the terminal 2-2 transmits an ACK signal to the base station 1 to thereby request transmission of next new data (see (5) in FIG. 3).

Furthermore, in the first embodiment, the terminal 2-2 demodulates (extracts) the new data destined for the other terminal 2-1 from the received wireless frame on the basis of the control information and retains the new data destined for the other terminal 2-1 (see (4) n FIG. 3). The terminal 2-2 may retain the data destined for the other terminal 2-1 which data is decoded or undecoded.

Figure 4:
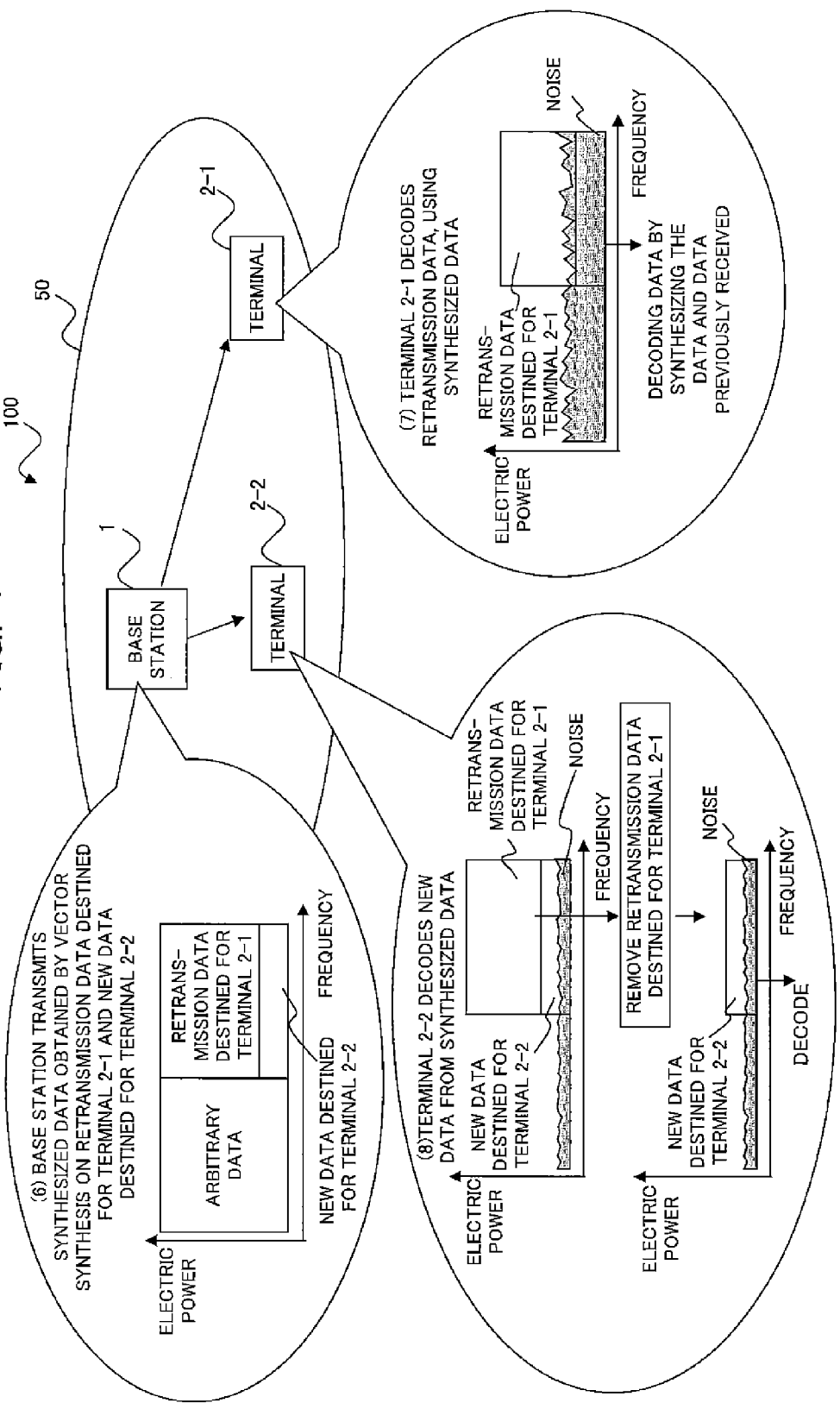

Next, as illustrated in FIG. 4, the base station 1 generates data (hereinafter called multiplexed data) multiplexed by synthesizing (combining)the retransmission data destined for the terminal 2-1 that has transmitted a NACK signal and next new data destined for the terminal 2-2 that has transmitted an ACK signal.

Then, the base station 1 transmits another wireless frame including at least the above multiplexed data to both terminals 2 (see (6) in FIG. 4).

Since a single communication resource is allocated to the multiplexed data, the single communication resource is allocated to both retransmission data destined for the terminal 2-1 and next new data destined for the terminal 2-2. The wireless frame may include arbitrary data in addition to the multiplexed data.

Here, description will now be made in relation to an example of the synthesis with reference to FIG. 5.

Figure 5:
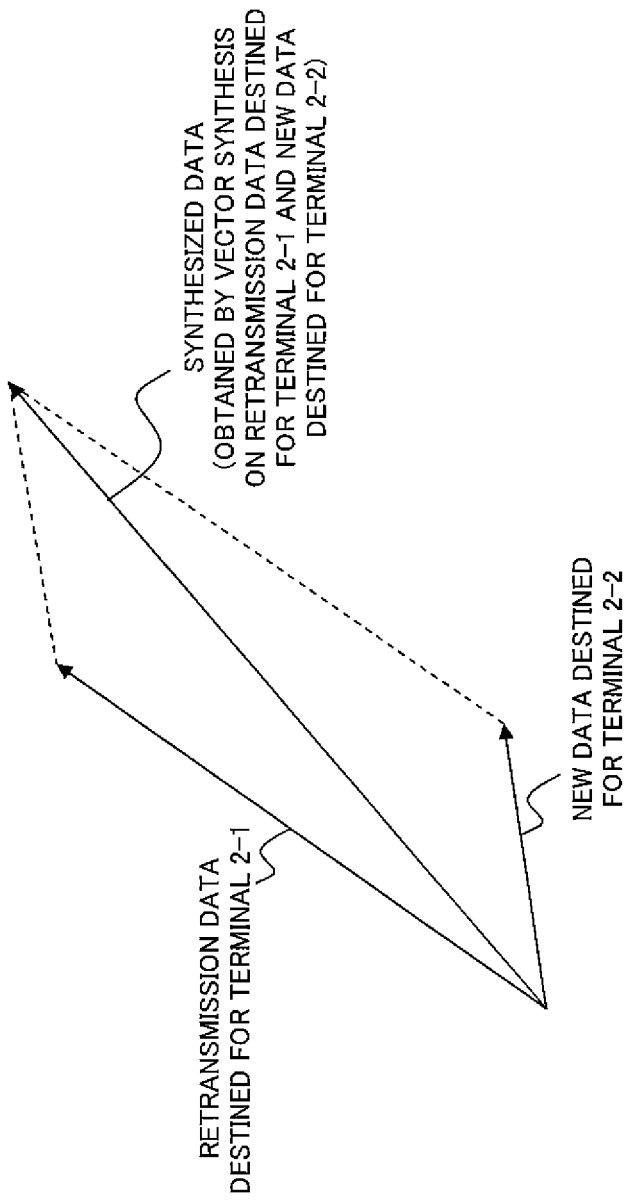
FIG. 5 is a diagram illustrating an example of synthesis.

As illustrated in FIG. 5, assuming that data destined for the terminal 2-1 and data terminal 2-2 are both phase modulated, the retransmission data destined for the terminal 2-1 and the next new data destined for the terminal 2-2 are expressed by vectors having directions and magnitudes respectively corresponding to the phases and transmission electric power allocated to the respective data. For example, when that data destined for the terminal 2-1 and data terminal 2-2 are both amplitude modulated, vectors having directions and magnitudes respectively corresponding amplitudes and transmission electric power may be used.

The base station 1 creates a vector corresponding to the multiplexed data by synthesizing (adding) a vector representing the retransmission data destined for the terminal 2-1 and a vector representing the new data destined for the terminal 2-2. Hereinafter, a vector which corresponds to the retransmission data destined for the terminal 2-1 and which is included in the vector representing the multiplexed data is sometimes called a retransmission data component while a vector which corresponds to the new data destined for the terminal 2-2 and which is included in the vector representing the multiplexed data is sometimes called a new data component.

On the basis of the phase and the magnitude of the vector corresponding to the multiplexed data, the base station 1 determines the phase and the transmission electric power of the multiplexed data and transmits the multiplexed data to the both terminals 2.

Here, assuming that the terminal 2-2 is positioned in the vicinity of the base station 1 while the terminal 2-1 is positioned within and in the vicinity of the boundary of the wireless area 50 as the above, the terminal 2-2 has a higher reception quality than that of the terminal 2-1.

For the above, selecting a low transmitting rate for data destined for the terminal 2-2 makes it possible to transmit the wireless frame to the terminal 2-2 using a lower transmission electric power than that allocated to the retransmission data destined for the terminal 2-1.

The transmission electric power to be allocated to new data destined for the terminal 2-2 is preferably one that, when the terminal 2-2 receives the multiplexed data, allows the terminal 2-2 to receive the new data component included in the multiplexed data irrespective of influence caused by noise. Concurrently, the transmission electric power to be allocated to new data destined for the terminal 2-2 is preferably one that, when the terminal 2-1 receives the multiplexed data, prevents the terminal 2-1 from receiving the new data component destined for the terminal 2-2 included in the multiplexed data due to influence caused by noise.

Referring back to FIG. 4, upon receipt of the wireless frame including the multiplexed data from the base station 1, the terminal 2-1 synthesizes (so-called retransmission synthesizes) the received multiplexed data and the new data destined for the own terminal 2-1 that has previously received and retained in the own terminal 2-1, and decodes the synthesized data (see (7) in FIG. 4).

The new data destined for the terminal 2-2 included in the multiplexed data cannot be detected by the terminal 2-1 (i.e., the new data component destined for the terminal 2-1 cannot be extracted) due to influence caused by the transmission loss generated in the transmission path between the base station 1 and terminal 2-1 for the above.

For this reason, the terminal 2-1 synthesizes previously received data retained in the same terminal and the multiplexed data, and decodes the synthesized data so that the retransmission data destined for the own terminal 2-1 can be successfully decoded, which makes it possible to prevent devices in the system from having complex configurations.

In the meantime, upon receipt of the wireless frame including the multiplexed data, the terminal 2-2 generates a replica of the retransmission data destined for the terminal 2-1 included in the multiplexed data on the basis of the data destined for the terminal 2-1 that the terminal 2-2 has previously received and stored.

Then, the terminal 2-2 removes the generated replica from the multiplexed data (through, for example, vector subtraction), thereby extracts the new data destined for the own terminal 2-2 from the multiplexed data, and decodes the extracted data (see (8) in FIG. 4).

As described above, in the first embodiment, the base station 1 transmits the multiplexed data that the base station 1 creates by synthesizing (combining) the retransmission data destined for the terminal 2-1 and the new data destined for the terminal 2-2 to the terminals 2-1 and 2-2, using a single communication resource.

The terminal 2-1 synthesizes data destined for the own terminal 2-1 retained in the same terminal and the received multiplexed data, and decodes the synthesized data while the terminal 2-2 extracts new data destined for the own terminal 2-2 by removing the retransmission data component destined for the other terminal 2-1 from the multiplexed data, and decodes the extracted data destined for the own terminal 2-2.

That improves the efficiency in using the communication resource as compared to a communication manner in which the retransmission data destined for the terminal 2-1 and the new data destined for the terminal 2-2 are independently transmitted, using different communication resources.

Next, description will now be made in relation to an example of the configuration of the base station 1 included in the above communication system 100 with reference to FIG. 6.

Figure 6:
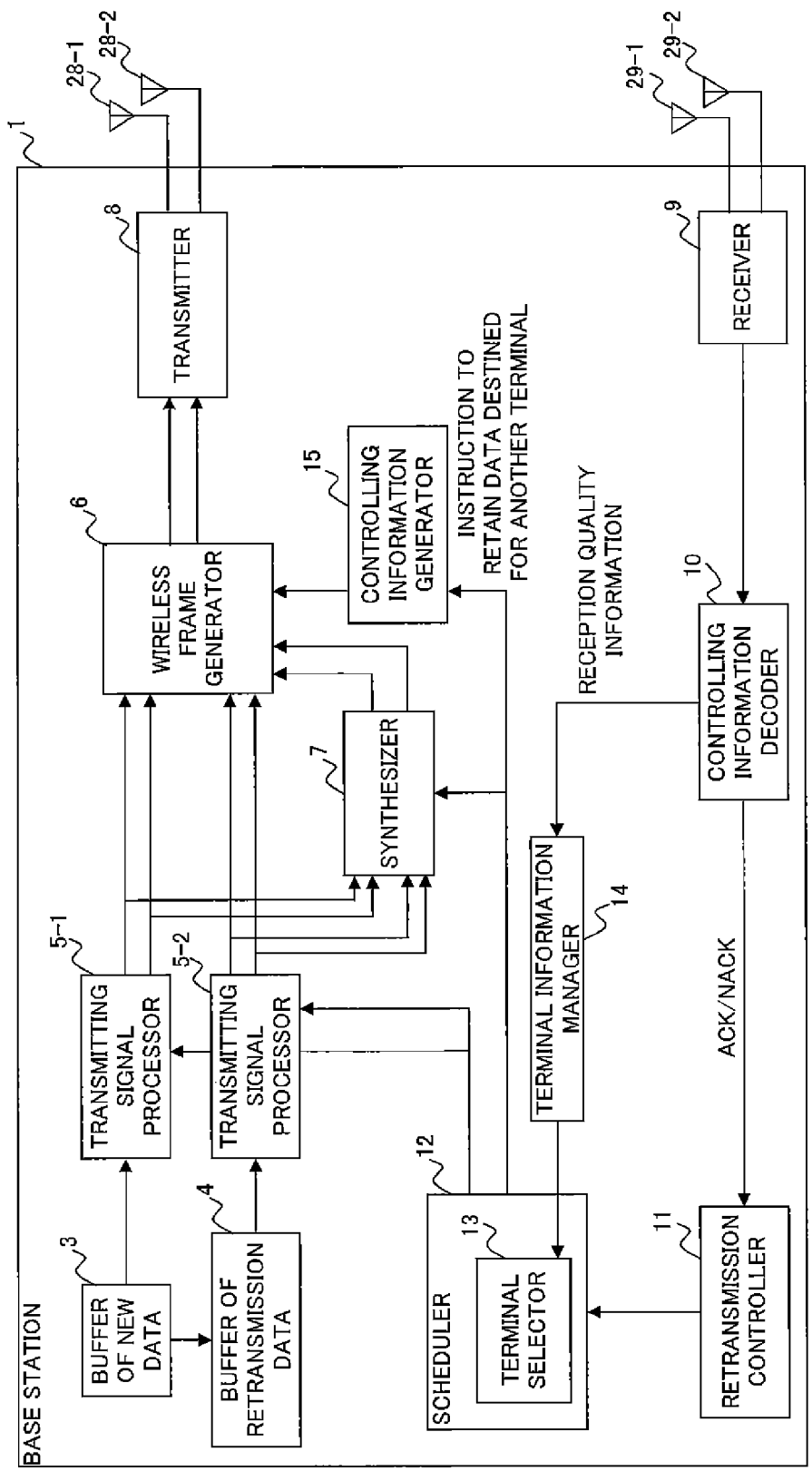
FIG. 6 is a diagram illustrating an example of the configuration of the base station of FIG. 2.

(1.2) An Example of the Configuration of the Base Station 1:

FIG. 6 is a block diagram schematically illustrating an example of the configuration of the base station 1.

The base station 1 illustrated in FIG. 6 exemplarily includes a buffer 3 of new data, a buffer 4 of retransmission data, transmitting signal processors 5-1 and 5-2, a wireless frame generator 6, a synthesizer 7, a transmitter 8, a receiver 9, a controlling information decoder 10, a retransmission controller 11, a scheduler 12, a terminal selector 13, a terminal information manager 14, a controlling information generator 15, transmitting antennas 28-1 and 28-2, and receiving antennas 29-1 and 29-2. The transmitting antennas are simply represented by reference number 28 if there is no requirement of discriminating the transmitting antennas 28-1 and 28-2 from each other. Similarly, the receiving antennas are simply represented by reference number 29 if there is no requirement of discriminating the receiving antennas 29-1 and 29-2 from each other. The number of transmitting antennas 28 and that of receiving antennas 28 are not limited to those illustrated in FIG. 6.

The buffer 3 of new data retains new data that is to be transmitted to a terminal 2 for the first time. Such new data may be one that another base station 1 or another terminal 2 transmits to the terminal 2 or one that the base station 1 creates. New data retained in the buffer 3 of new data is sent to the buffer 4 of retransmission data and the transmitting signal processor 5-1.

The transmitting signal processor 5-1 encodes new data and allocates transmission electric power to new data under instructions of the scheduler 12 (scheduling control). New data processed and controlled as the above by the transmitting signal processor 5-1 is then sent to the wireless frame generator 6 or to the synthesizer 7 under instructions of the scheduler 12.

The buffer 4 of retransmission data retains retransmission data to be retransmitted to a terminal 2. Such retransmission data may be a duplicate of new data retained in the buffer 3 of new data or data created on the basis of the new data retained in the buffer 3 of new data. The buffer 4 of retransmission data may retain retransmission data for a period between transmission of corresponding new data to a terminal 2 and transmission of the retransmission data in response to a retransmission request. The data retained in the buffer 4 of retransmission data may be regularly or irregularly deleted by the base station 1. Retransmission data retained by the buffer 4 of retransmission data is sent to the transmitting signal processor 5-2.

The transmitting signal processor 5-2 encodes retransmission data and allocates transmission electric power to the retransmission data under instructions of the scheduler 12 (scheduling control). Retransmission data processed and controlled as the above by the transmitting signal processor 5-2 is then sent to the wireless frame generator 6 or to the synthesizer 7 under instructions of the scheduler 12.

When the base station 1 receives a retransmission request from the terminal 2-1 that is one of the terminals 2, the synthesizer 7 synthesizes retransmission data destined for the terminal 2-1 and new data destined for another terminal 2-2 to thereby create synthesized data. For example, under instructions of the scheduler 12, the synthesizer 7 synthesizes new data from the transmitting signal processor 5-1 and retransmission data from the transmitting signal processor 5-2. Specifically, the synthesizer 7 synthesizes the next new data destined for the terminal 2-2 that has transmitted an ACK signal and the retransmission data destined for the terminal 2-1 that has transmitted a NACK signal to thereby create multiplexed data and sends the multiplexed data to the wireless frame generator 6. The synthesizer 7 can omit the above synthesis if retransmission data is not transmitted to a terminal 2. When the base station 1 includes a number of transmitting antennas 28 as illustrated in FIG. 6, the synthesizer 7 creates multiplexed data by synthesizing new data and retransmission data for each transmitting antenna 28.

The synthesizer 7 creates multiplexed data through vector synthesis on retransmission data destined for one terminal 2 and data destined for the other terminal 2. However, another data synthesis can be applied. In other words, vector synthesis can be replaced by any method which allows a terminal to extract data destined for another terminal from synthesized data, using the synthesized data and retransmission data.

The controlling information generator 15 creates control information that is to be sent to each terminal 2 under instructions of the scheduler 12. The control information includes, for example, information (mapping information) about allocation of data in a wireless frame, the encoding rate of each data, the demodulation scheme of each data, and the transmission electric power of each data. In addition, the control information further includes, for example, assignment information (terminal assignment information) about retaining data destined for another terminal 2 as to be detailed below.

The wireless frame generator 6 maps new data destined for each terminal 2, retransmission data, multiplexed data, and control information using the communication resource for data transmission and thereby creates a wireless frame under instructions of the scheduler 12.

Here, in the first embodiment, the wireless frame generator 6 allocates a single communication resource to the multiplexed data so that a single communication resource (e.g., time, frequency, code and hardware such as an antenna) is allocated to both retransmission data destined for the terminal 2-1 and next new data destined for the terminal 2-2. A wireless frame created by the wireless frame generator 6 is sent to the transmitter 8.

The transmitter 8 carries out a predetermined wireless transmission process (e.g., modulation) on a wireless frame created by the wireless frame generator 6 and then transmits the wireless frame to the terminals 2 through the transmitting antenna 28. In other words, the transmitter 8 functions as an example of a transmitter which transmits synthesized data created by the synthesizer 7 using a single communication resource.

The receiver 9 carries out a predetermined wireless reception process (e.g., demodulation) on a wireless signal received from a terminal through the receiving antenna 29 and receives the wires frame. A wireless frame received by the receiver 9 is sent to the controlling information decoder 10.

The controlling information decoder 10 extracts control information from a received wireless frame and decodes the extracted control information. The control information decoded by the controlling information decoder 10 includes reception quality information and an ACK or NACK signal respectively indicating the absence or presence of an error in received data notified from each terminal 2. Reception quality information decoded by the controlling information decoder 10 is sent to the terminal information manager 14 and an ACK or NACK signal decoded by the controlling information decoder 10 is sent to the retransmission controller 11.

The terminal information manager 14 manages the reception quality of each terminal 2 on the basis of the reception quality information decoded by the controlling information decoder 10.

The retransmission controller 11 controls retransmission to a terminal 2 on the basis of an ACK or NACK signal decoded by the controlling information decoder 10. For example, the retransmission controller 11 controls the transmitting signal processors 5-1 and 5-2 through the scheduler 12 such that next new data is transmitted to a terminal 2 which has transmitted an ACK signal while retransmission data is transmitted to a terminal 2 which has transmitted a NACK signal.

The terminal selector 13 selects a terminal 2 that is to serve as the terminal 2-2 that is to retain data destined for another terminal 2-1 on the basis of the reception quality information from the terminal information manager 14. Information (terminal assignment information) about the terminal 2-2 selected by the terminal selector 13 and the other terminal 2-1 is sent to the controlling information generator 15 and is transmitted, in the form of being included in the control information, to the terminals 2.

Alternatively, the terminal selector 13 may select a terminal 2 having a reception quality higher than that of the terminal 2-1 that has transmitted a NACK signal by a predetermined threshold or more as the terminal 2-2, and may control the scheduler 12 such that new data destined for the selected terminal 2-2 is included in the multiplexed data. The terminal selector 13 may select a terminal 2 as the terminal 2-2 from terminals 2 that have transmitted ACK signals to the base station 1.

The terminal selector 13 may select a terminal 2 having a reception quality higher than that of a certain terminal 2-1 by a predetermined threshold or more as the terminal 2-2 that is to retain new data destined for the terminal 2-1.

Furthermore, the terminal selector 13 may control the scheduler 12 such that new data destined for the selected terminal 2-2 having a reception quality higher than that of the terminal 2-1 by a predetermined threshold or more is included in the multiplexed data.

Namely, the terminal selector 13 and the scheduler 12 have a function of selecting at least one other terminal (e.g., the terminal 2-2) that is to retain the new data destined for the terminal 2-1 beforehand which data corresponds to the retransmission data destined for the terminal 2-1.

The transmitter 8 has a function of instructing the selected terminal 2 to retain new data destined for the terminal 2-1 before the multiplexed data is transmitted.

The scheduler 12 controls scheduling of data transmission to the respective terminals 2.

For example, the scheduler 12 determines the allocation of each data in a wireless frame, an encoding rate, a modulation scheme, and a transmission electric power to each data on the basis of reception quality information of the respective terminals 2. In the first embodiment, the transmission electric power to be allocated to new data destined for the terminal 2-2 is determined to be one that, when the terminal 2-2 receives the multiplexed data, allows the terminal 2-2 to receive the new data destined for the terminal 2-2 included in the multiplexed data received in the terminal 2-2 irrespective of influence caused by noise and that, when the terminal 2-1 receives the multiplexed data, concurrently prevents the terminal 2-1 from receiving the new data destined for the terminal 2-2 included in the multiplexed data received in the terminal 2-1 due to the influence caused by noise.

In other words, the scheduler 12 functions as an example of a controller that allocates a transmission electric power lower than that to be allocated to the retransmission data destined for the terminal 2-1 by a predetermined level to the new data destined for the terminal 2-2. The predetermined level is determined depending on at least one of, for example, a possible noise signal of each terminal 2, a propagation loss of the transmission path between the base station 1 and each terminal 2, a propagation environment between the base station 1 and each terminal 2; and reception quality of each terminal 2.

In addition, the scheduler 12 controls the transmitting signal processors 5-1 and 5-2 on the basis of the presence or the absence of new data and retransmission data under the control of the retransmission controller 11, and further controls the synthesizer 7 on the basis of whether multiplexed data has been created. Furthermore, the scheduler 12 controls the controlling information generator 15 on the basis of assignment of the terminal 2-2 selected by the terminal selector 13 that is to retain the data destined for the other terminal 2-1.

Thereby, the base station 1 can selectively transmit new data, retransmission data, or multiplexed data in accordance with a response signal (ACK or NACK) from a terminal 2.

The base station 1 selects a terminal 2 as the terminal 2-2 that is to retain data destined for the other terminal 2-1 on the basis of the reception quality information from the respective terminals 2, and instructs the selected terminal 2-2 to retain the data destined for the other terminal 2-1.

Next, description will now be made in relation to an example of the configuration of a terminal 2 included in the communication system 100 with reference to FIG. 7.

Figure 7:
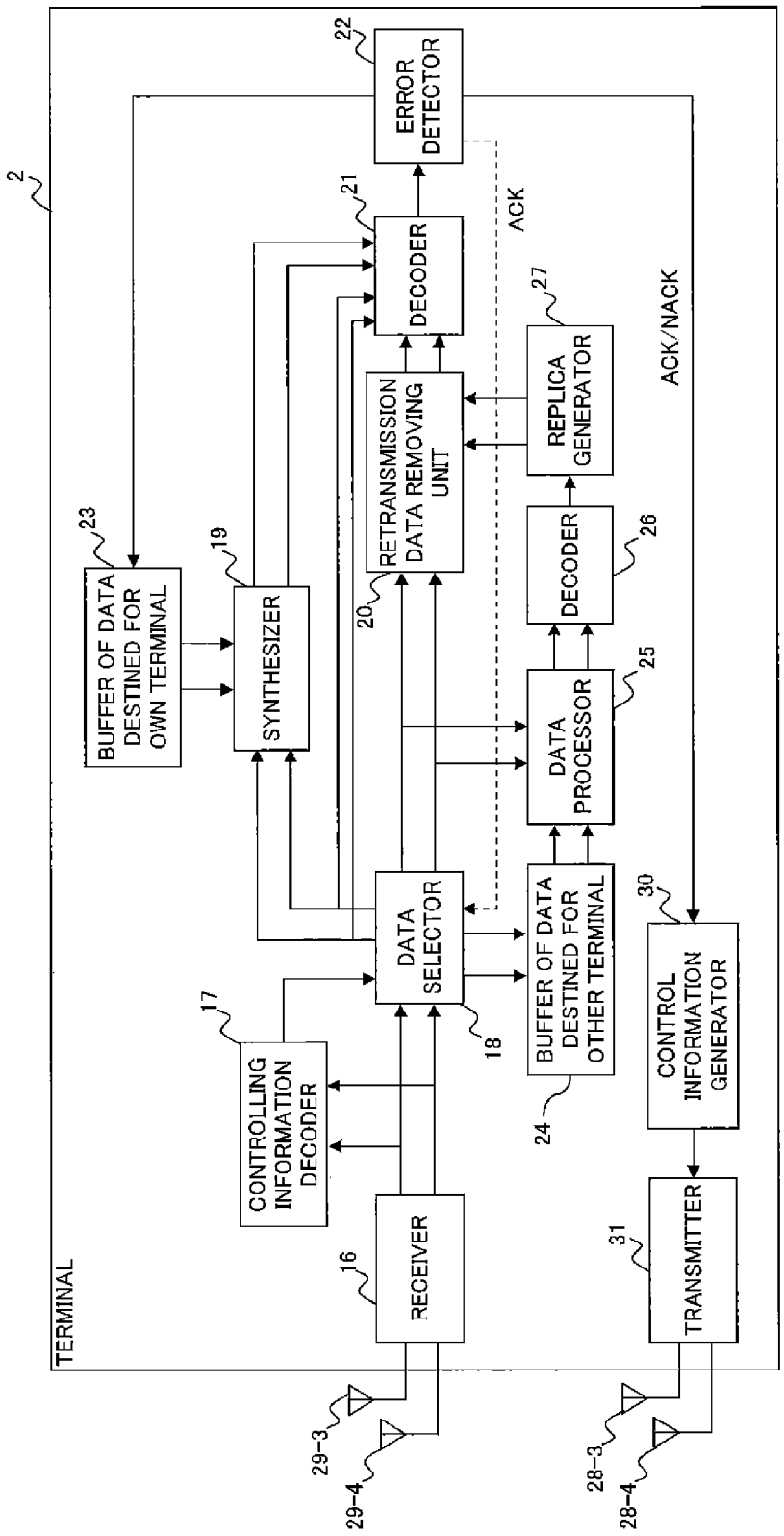
FIG. 7 is a diagram illustrating an example of the configuration of each terminal of FIG. 2.

(1.3) An Example of the Configuration of a Terminal 2:

FIG. 7 is a block diagram schematically illustrating an example of the configuration of the terminal 2.

The terminal 2 illustrated in FIG. 7 exemplarily includes a receiver 16, a controlling information decoder 17, a controlling information generator 18, a synthesizer 19, a retransmission data removing unit 20, a decoder 21, an error detector 22, a buffer 23 of data destined for own terminal, a buffer 24 of data destined for other terminal, a data processor 25, a decoder 26, a replica generator 27, a control information generator 30, a transmitter 31, transmitting antennas 28-3 and 28-4, and receiving antennas 29-3 and 29-4. The transmitting antennas are simply represented by reference number 28 if there is no requirement of discriminating the transmitting antennas 28-3 and 28-4 from each other. Similarly, the receiving antennas are simply represented by reference number 29 if there is no requirement of discriminating the receiving antennas 29-3 and 29-4 from each other. The number of transmitting antennas 28 and that of receiving antennas 28 are not limited to those illustrated in FIG. 7.

The receiver 16 carries out a predetermined wireless reception processing (e.g. demodulation) on a wireless signal received from the base station 1 through the receiving antenna 29 and thereby receives the wireless frame. The wireless frame received by the receiver 16 is sent to the controlling information decoder 17 and the controlling information generator 18.

The controlling information decoder 17 extracts control information from the wireless frame received by the receiver 16, and decodes the extracted control information. The control information includes, for example, mapping information, an encoding rate, a demodulation scheme, and a transmission electric power of each data. The control information may include the above terminal assignment information. The mapping information, the encoding rate, the demodulation scheme, and the transmission electric power of each data decoded by the controlling information decoder 17 are sent to the controlling information generator 18.

The controlling information generator 18 selectively extracts data destined for the own terminal 2, data destined for the other terminal 2-1, or the multiplexed data on the basis of the mapping information decoded by the controlling information decoder 17. Alternatively, the controlling information generator 18 may select the data destined for the terminal 2-1 on the basis of the terminal assignment information. Further alternatively, the controlling information generator 18 may select data destined for the terminal 2-1 when the terminal assignment terminal assigns the own terminal as the terminal 2-2.

Furthermore, the controlling information generator 18 changes the destination of sending the selected data with the kind of selected data. For example, if the controlling information generator 18 selects new data destined for the own terminal 2, the selected data is sent to the decoder 21; if the controlling information generator 18 selects retransmission data destined to the own terminal 2, the selected data is sent to the synthesizer 19; and if the controlling information generator 18 selects new data destined for the other terminal 2-1, the selected data is sent to the buffer 24 of data destined for other terminal.

Further, if the controlling information generator 18 selects multiplexed data, the selected multiplexed data is sent to the retransmission data removing unit 20, or alternatively may be sent to the data processor 25.

Namely, the receiver 16 and the controlling information generator 18 collectively function as an example of a receiver that receives multiplexed data multiplexed by the base station 1 through synthesis on new data destined for the own terminal 2-2 and retransmission data destined for the other terminal 2-1.

The decoder 21 decodes new data destined for the own terminal 2 selected by the controlling information generator 18 on the basis of the control information decoded by the controlling information decoder 17.

On the basis of the control information decoded by the controlling information decoder 17, the decoder 21 additionally decodes data created by the synthesizer 19 through synthesis on data destined for the own terminal 2 previously received and retransmission data destined for the own terminal 2.

In addition, on the basis of the control information decoded by the controlling information decoder 17, the decoder 21 decodes new data destined for the own terminal 2-2 that the retransmission data removing unit 20 extracted through removing retransmission data destined for the other terminal 2-1 from the multiplexed data.

Each data decoded by the decoder 21 is sent to the error detector 22.

The error detector 22 carries out error detection on data received from the decoder 21. The error detection can use an error detection code such as a CRC code.

If the error detector 22 detects an error in data, a NACK signal is sent to the control information generator 30 and the data destined for the own terminal 2 received from the base station 1 is sent to the buffer 23 of data destined for own terminal.

On the other hand, if no error is detected in data, an ACK signal is sent to the control information generator 30 and the decoded data destined for the own terminal 2 is sent to an application processor or another functional unit included in the same terminal 2. Alternatively, the ACK signal may be sent to the controlling information generator 18. That allows the controlling information generator 18 to rapidly select next new data destined for the own terminal 2 which data is to be transmitted from the base station 1.

The control information generator 30 generates control information to be transmitted to the base station 1. The control information includes, for example, reception quality information received by the terminal 2 itself, and an ACK or NACK signal for data that the terminal 2 has received.

The transmitter 31 allocates the control information created by the control information generator 30 to a wireless frame and carries out a predetermined transmission processing (e.g., modulation) on the wireless frame, and transmits the wireless frame to the base station 1 through the transmitting antenna 28. The wireless frame to be transmitted to the base station 1 may include user data destined for the base station 1 created by the terminal 2 in addition to the control information.

The buffer 23 of data destined for own terminal stores data destined for the own terminal 2 received from the base station 1. Data destined for the own terminal 2 (previously received) stored in the buffer 23 of data destined for own terminal is used for retransmission synthesis of HARQ or the like. The buffer 23 of data destined for own terminal may retain the data for a period between transmission of the NACK signal from the terminal 2 to the base station 1 and reception of the retransmission data at the terminal 2 from the base station 1. The data stored in the buffer 23 of data destined for own terminal may be regularly or irregularly deleted by the own terminal 2.

The buffer 23 of data destined for own terminal function as an example of a memory that retains data (requested data) for which the retransmission request is issued.

The data retained (stored) in the buffer 23 of data destined for own terminal is sent to the synthesizer 19.

The synthesizer 19 synthesizes the retransmission data destined for the own terminal 2 selected by the controlling information generator 18 and the data previously received and stored in the buffer 23 of data destined for own terminal. The manner of the synthesis in HARQ is, for example, Chase Combination or IR Combination.

In other words, the synthesizer 19 functions as an example of a synthesizer that synthesizes new data destined for the own terminal 2-2 retained by the buffer 23 of data destined for own terminal and the multiplexed data.

The decoder 21 functions as an example of a decoder that receives synthesized data from the base station 1 and decodes data that the own terminal 2 desires on the basis of the received synthesized data and the requested data retained by the buffer 23 of data destined for own terminal of the own terminal 1.

In contrast, the buffer 24 of data destined for other terminal retains (stores) data destined for the other terminal 2-1 included in the wireless frame received from the base station 1. The buffer 24 of data destined for other terminal may retain data for a period between the reception of the data destined for the other terminal 2-1 and extraction of data destined for the own terminal 2-2 through removing the retransmission data destined for the other terminal 2-1 from the multiplexed data received from the base station 1. The data retained in the buffer 24 of data destined for other terminal may be regularly or irregularly cleared by the own terminal 2. The data retained in the buffer 24 of data destined for other terminal is sent to the data processor 25.

If the reception quality of the other terminal 2-1 is higher than a predetermined threshold, the buffer 24 of data destined for other terminal may discard new data destined for the other terminal 2-1.

Furthermore, the buffer 24 of data destined for other terminal may retain new data destined for a terminal 2-1 assigned by the base station 1.

The data processor 25 extracts the retransmission data component destined for the other terminal 2-1 from the multiplexed data on the basis of new data destined for the other terminal 2-1 being retained and the multiplexed data.

This is because, in some retransmission control schemes that the communication system 100 may adopt, the new data and retransmission data may not be the same. In other words, the data processor 25 extracts the retransmission data component destined for the other terminal 2-1 from the multiplexed data received from the base station 1 by carrying out a predetermined arithmetic operation on the new data destined for the other terminal 2-1, the data being stored in the buffer 24 of data destined for other terminal, and the multiplexed data. If the communication system 100 adopts a retransmission manner in which new data and retransmission data are the same, the data processor 25 can be omitted.

The decoder 26 decodes data destined for the other terminal 2-1.

The replica generator 27 re-encodes the data destined for the other terminal 2-1 decoded by the decoder 26 on the basis of the control information received from the base station 1 and thereby creates a replica of the retransmission data destined for the other terminal 2-1.

In other words, the data processor 25, the decoder 26, and the replica generator 27 (or the decoder 26 and the replica generator 27) collectively create a replica of the retransmission data destined for the other terminal 2-1 included in the multiplexed data on the basis of the new data destined for the other terminal 2-1 retained in the buffer 24 of data destined for other terminal.

If the new data destined for the other terminal 2-1 being retained by the buffer 24 of data destined for other terminal can serve as a replica without requiring any process, the data processor 25, the decoder 26, and the replica generator 27 may be omitted. However, as compared with this case, the replica has an improved accuracy which the data processor 25, the decoder 26, and the replica generator 27 collectively create on the basis of the new data destined for the other terminal 2-1 being retained in the buffer 24 of data destined for other terminal.

The retransmission data removing unit (extracting unit) 20 extracts the new data component destined for the own terminal 2-2 from the multiplexed data received from the base station 1 by removing the replica (corresponding to the retransmission data destined for the other terminal 2-1) from the multiplex data received from the base station 1.

With this configuration, the terminal 2-2 can extract the data destined for the own terminal 2-2 from the multiplexed data received from the base station 1.

Next, description will now be made in relation to an example of operation of the communication system 100 with reference to FIG. 8.

Figure 8:
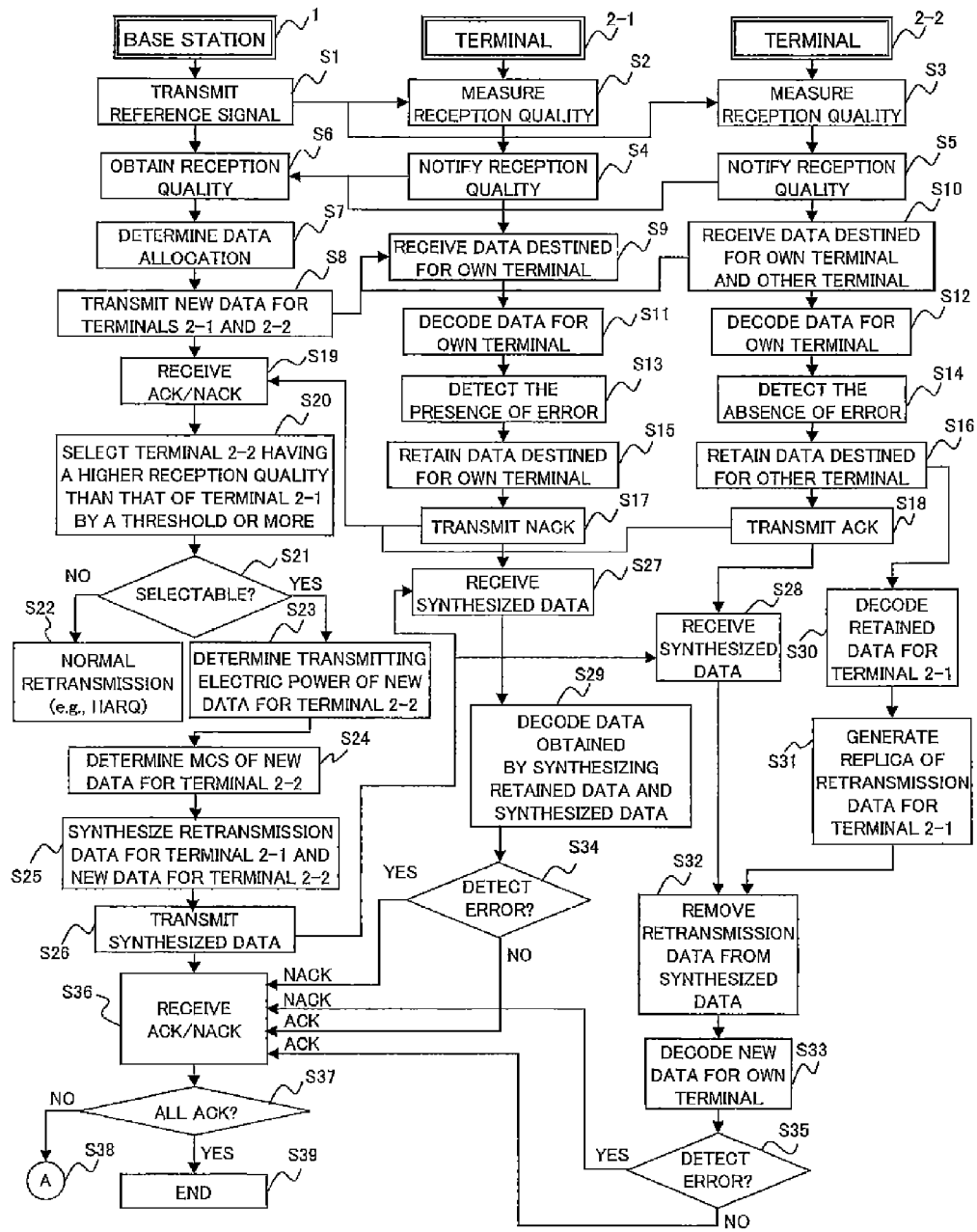
FIGS. 8 and 9 are a flow chart illustrating a succession of procedural steps in the communication system in FIG. 2.

(1.4) An Example of Operation of the Communication System 100:

FIG. 8 is a flow chart illustrating of a succession of procedural steps performed in the communication system 100. To simplify the description, the first embodiment assumes that the terminal 2-1 has lower reception quality (a lower SINR) than that of the terminal 2-2 and concurrently the terminal 2-1 and the terminal 2-2 return a NACK and an ACK, respectively, to the base station 1. For example, the first embodiment assumes that the terminal 2-2 is positioned in the vicinity of the base station 1 while the terminal 2-1 is positioned within and in the vicinity of the boundary of the wireless area 50. However, the positional relationship of the terminals should by no means be limited to this example.

First, the base station 1 transmits a reference signal (e.g., pilot signal) to the terminals 2-1 and 2-2 (step S1), as illustrated in FIG. 8.

Upon receipt of the reference signal from the base station 1, the terminals 2-1 and 2-2 measure the respective reception quality thereof (steps S2 and S3) and transmit information about measured reception quality (reception quality information) to the base station 1 (steps S4 and S5).

Then, the base station 1 obtains reception quality of each terminal 2 on the basis of the reception quality information notified from the terminals 2-1 and 2-2 (step S6) and determines an encoding scheme, an modulation scheme, a transmission electric power, and scheduling (data allocation) of data to be transmitted to each terminal 2 (step S7).

Next, the base station 1 transmits new data (i.e. new data destined for the terminal 2-1 and the new data destined for the terminal 2-2) to both terminals 2-1 and 2-2 (step S8) in accordance with the data allocation determined for each terminal 2. In step S8, the data is sent to the respective terminals 2 using the different resources.

The terminal 2-1 selectively receives new data destined for the own terminal 2-1 from the wireless frame received from the base station 1 (step S9) and attempts to decode the new data (step S11).

Here, this example assumes that the terminal 2-1 detects an error in the received new data destined for the own terminal 2-1 (step S13), retains the received new data (step S15), and transmits a NACK signal to the base station 1 to thereby request the base station 1 to retransmit the same data (step S17).

In the meantime, the terminal 2-2 selectively receives new data destined for the own terminal 2-2 and new data destined for the other terminal 2-1 from the wireless frame received from the base station 1 (step S10) and attempts to decode the new data destined for the own terminal 2-2 (step S12).

Here, this example assumes that the terminal 2-2 detects the absence of an error in the new data destined for the own terminal 2-2 (step S14), retain the new data destined for the other terminal 2-1 (step S16), and transmits an ACK signal to the base station 1 to thereby request the base station 1 to transmit next new data (step S18).

Next, the base station 1 receives the NACK signal from the terminal 2-1 and the ACK signal from the terminal 2-2 (step S19).

Then the base station 1 selects the terminal 2-2 that has reception quality higher than that of the terminal 2-1 which has transmitted the NACK signal by a threshold T (T>0) [dB] or more and that has sent to the ACK signal (step S20).

Here, the threshold T can be determined in terms of, for example, a ratio (transmission electric power of retransmission data/that of new data) transmission electric power allocated to transmission data to that allocated to new data which powers are allocated when the base station 1 synthesizes the retransmission data and the new data.

For example, the base station 1 determines the transmission electric power to be allocated to new data destined for the terminal 2-2 in such an extent that the terminal 2-2 can receive the new data destined for the terminal 2-2 irrespective of influence caused by noise when the multiplexed data is received by the terminal 2-2 and that concurrently the terminal 2-1 cannot receive the new data destined for the terminal 2-2 due to influence caused by noise when the multiplexed data is received by the terminal 2-1. The threshold T is determined so as to comply with the above conditions.

Next, on the basis of the reception quality information received from the respective terminals 2, the base station 1 judges whether such a terminal 2-2 satisfying the condition of step S20 is selectable (i.e., judges the presence of such a terminal 2-2) (step S21).

As a result of the judgment, if a terminal 2-2 satisfying the condition cannot be selected (NO route in step S21), the base station 1 carries out normal retransmission processing (e.g., HARQ) (step S22). Specifically, the base station 1 transmits the retransmission data destined for the terminal 2-1 and the next new data destined for the terminal 2-2 using different communication resources.

Conversely, if a terminal 2-2 satisfying the condition can be selected (YES route in step S21) as the result of the judgment, the base station 1 determines the transmission electric power to be allocated to the next new data destined for the terminal 2-2 (step S23).

In addition, the base station 1 determines the MCS to be applied to the next new data destined for the terminal 2-2 on the basis of the reception quality of the terminal 2-2 (step S24).

Here, the base station 1 may determine the transmission electric power of the next new data destined for the terminal 2-2 on the basis of a factor obtained by subtracting T from the transmission electric power of the retransmission data destined for the terminal 2-1. Similarly, the base station 1 may determine the MCS of the next new data destined for the terminal 2-2 on the basis of a factor obtained by subtracting T from the reception quality of new data destined for the terminal 2-2.

The base station 1 creates the multiplexed data (synthesized data) by synthesizing the retransmission data destined for the terminal 2-1 and the next new data destined for the terminal 2-2 (step S25) and transmits the multiplexed data to the respective terminals 2 (step S26).

Upon receipt of the multiplexed data from the base station 1 (step S27), the terminal 2-1 carries out retransmission synthesis on the multiplexed data and the new data destined for the own terminal 2-1 which has previously received, decodes the desired data destined for the own terminal 2-1 (step S29), and detects the presence or the absence of an error in the decoded data (step S34).

If the detection finds an error in the decoded data (YES route in step S34), the terminal 2-1 transmits a NACK signal to the base station 1 while, if the detection finds no error in the decoded data (NO route in step S34), the terminal 2-1 transmits an ACK signal to the base station 1.

Upon receipt of the multiplexed data from the base station 1 (step S28), the terminal 2-2 decodes the new data destined for the other terminal 2-1 which has been previously received (step S30) and re-modulates the decoded data on the basis of the control information of the wireless frame to thereby generate a replica corresponding to the retransmission data destined for the terminal 2-1 included in the multiplexed data (step S31).

Then the terminal 2-2 removes the replica generated in step S31 from the multiplexed data received from the base station 1 (through, for example, vector subtraction) (step S32), thereby extracts the next new data destined for the own terminal 2-2 from the multiplexed data, decodes the extracted data (step S33), and detects the presence or the absence of an error in the decoded data (step S35).

If the detection finds an error in the decoded data (YES route in step S35), the terminal 2-2 transmits a NACK signal to the base station 1 while, if the detection finds no error in the decoded data (NO route in step S35), the terminal 2-2 transmits an ACK signal to the base station 1.

The base station 1 then receives an ACK or NACK signal from each terminal 2 (step S36) and judges whether signals received from all the terminals 2 are ACK signals (step S37).

Here, if all the both response signals from the terminals 2-1 and 2-2 are ACK signals (YES route in step S37), the base station 1 terminates the procedure of the retransmission control processing of the first embodiment (step S39).

On the other hand, if the response signals from the terminals 2-1 and 2-2 include a NACK signal (No route in step S37), the base station 1 moves the procedure to sequence A (step S38).

Figure 9:
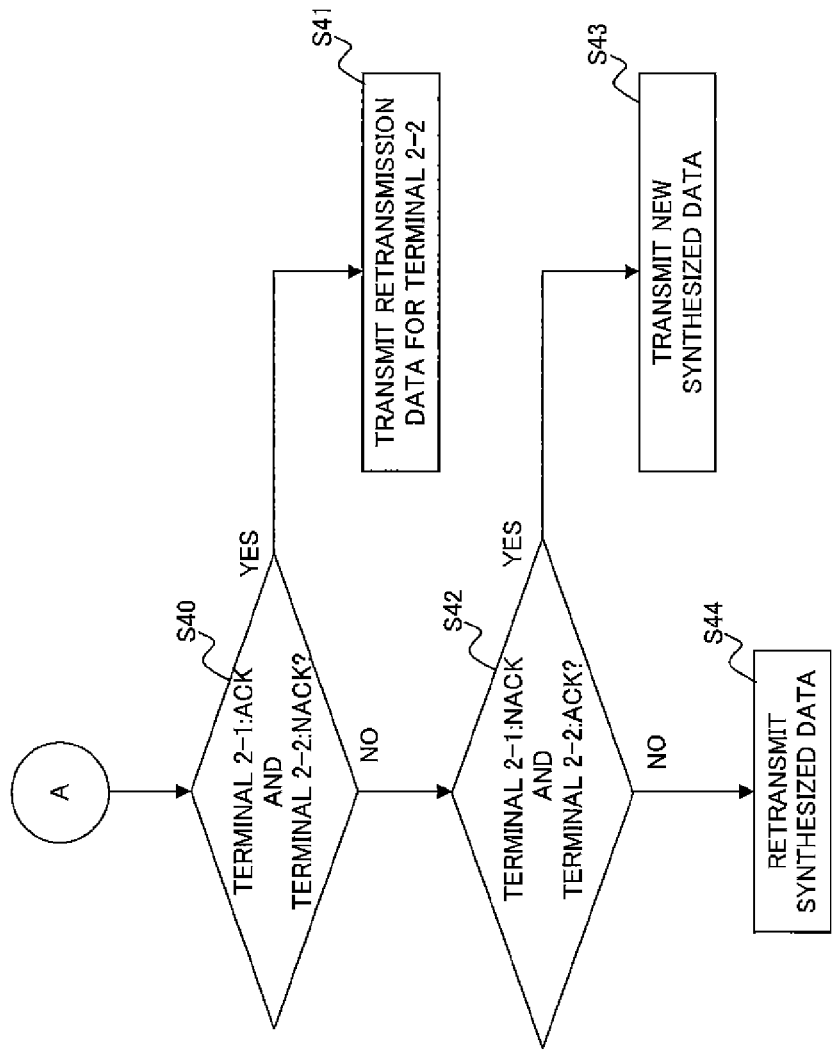

FIG. 9 illustrates an example of the sequence A.

As illustrated in FIG. 9, the base station 1 first judges whether the response signal from the terminal 2-1 is an ACK signal and concurrently that from the terminal 2-2 is a NACK signal on the basis of the contents of the response signals received from the terminals 2-1 and 2-2 (step S40).

As the result of the judgment, if the response signal from the terminal 2-1 is an ACK signal and concurrently that from the terminal 2-2 is a NACK signal (YES route in step S40), the base station 1 transmits corresponding retransmission data to the terminal 2-2 (step S41). Here, the corresponding transmission data is data that has caused the NACK signal from the terminal 2-2, and in this case, one corresponding to the next new data destined for the terminal 2-2 included in the multiplexed data that the base station 1 has transmitted.

Conversely, if the judgment in step S40 concludes the response signal from the terminal 2-1 is not an ACK signal or that from the terminal 2-2 is not a NACK signal (NO route instep S40), the base station 1 further judges whether the response signal from the terminal 2-1 is a NACK signal and concurrently that from the terminal 2-2 is an ACK signal (step S42).

As the result of the judgment, if the response signal from the terminal 2-1 is a NACK signal and concurrently that from the terminal 2-2 is an ACK signal (YES route in step S42), the base station 1 transmits multiplexed data created by synthesizing the retransmission data destined for the terminal 2-1 and new data destined for the terminal 2-2 that comes after the next new data to the respective terminals (step S43). In this case, the base station 1 may transmit multiplexed data created by synthesizing the retransmission data for the terminal 2-1 and new data destined for another terminal 2 which has a higher reception quality than that of the terminal 2-2 to the respective terminals 2.

Conversely, if the response signal from the terminal 2-1 is a NACK signal and concurrently that from the terminal 2-2 is a NACK signal (NO route in step S42), the base station 1 retransmits the same multiplexed data that transmitted for the last time to the respective terminals 2 (step S44).

As described above, in the first embodiment, the base station 1 transmits the multiplexed data created by synthesizing retransmission data destined for the terminal 2-1 and new data destined for the terminal 2-2, using a single communication resource, and each terminal 2 extracts data destined for the own terminal 2 and decodes the extracted data.

Thereby, communication resources can be more efficiently used as compared with the cases where retransmission data destined for the terminal 2-1 and new data destined for the terminal 2-2 are transmitted using respective different communication resources.

(2) First Modification:

The above first embodiment assumes that the terminal 2-2 voluntarily selects new data destined for the other terminal 2-1 from the wireless frame received from the base station 1 and retains the selected data so that the terminal 2-2 can extract the new data destined for the own terminal 2-2 from multiplexed data that the base station 1 will transmit to the terminal 2-2 later. Alternatively, a terminal 2-2 previously assigned by the base station 1 may select and store new data destined for the other terminal 2-1 from the wireless frame received from the base station 1, as performed in this modification.

Since the reception quality of the other terminal 2-1, which is the destination of the data retained by the terminal 2-2, is lower than that of the terminal 2-2, the terminal 2-2 may retain data destined for the other terminal 2-1 having a reception quality lower than a predetermined threshold.

Further, in some retransmission control schemes that the communication system 100 may adopt, the new data and retransmission data may not be the same. Therefore, the terminal 2-2 may generate a replica corresponding to the retransmission data component destined for the other terminal 2-1 included in the multiplexed data received from the base station 1 on the basis of the new data destined for the other terminal 2-1 that the terminal 2-2 has previously stored and the received multiplexed data.

Figure 10:
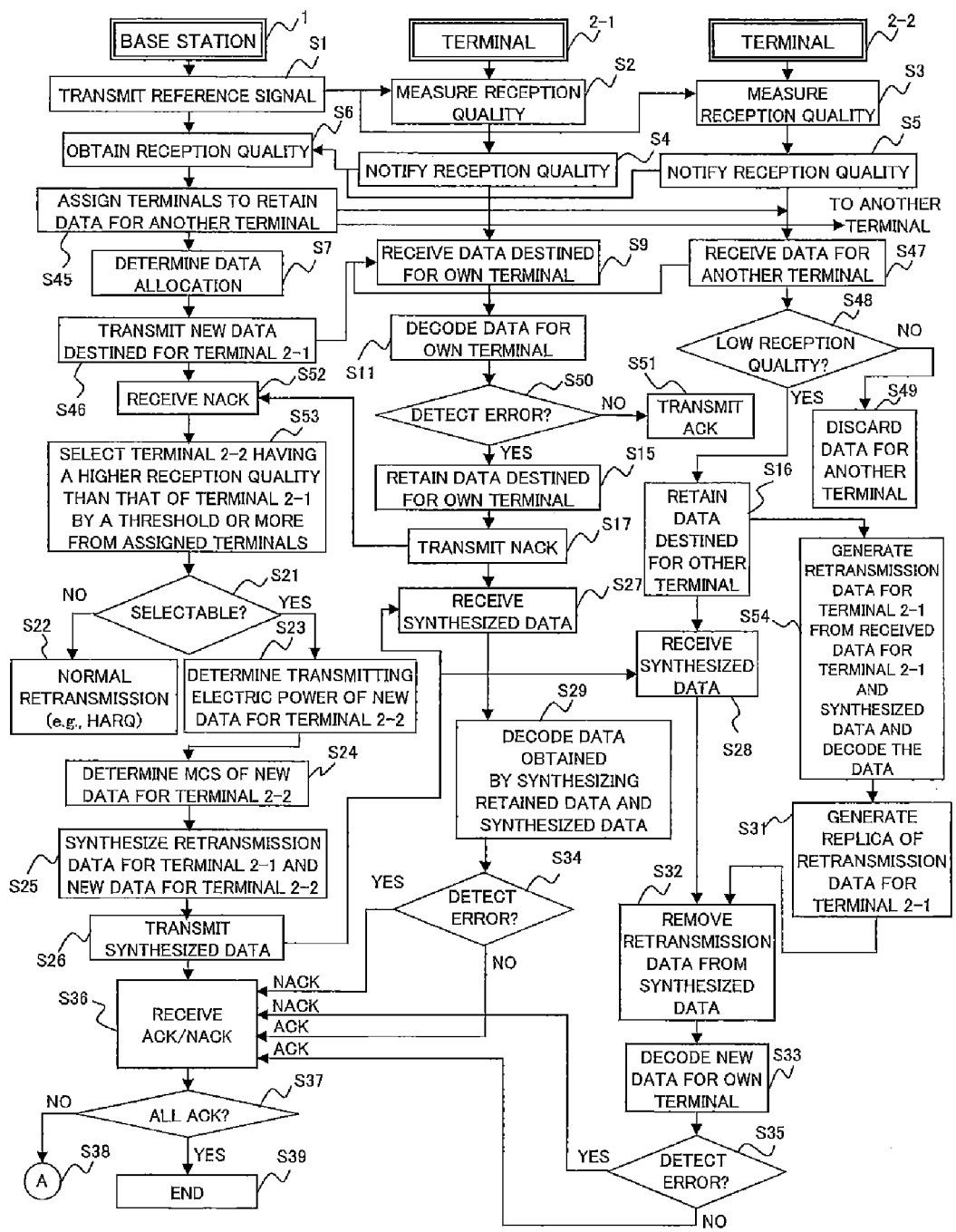
FIG. 10 is a flow chart illustrating a succession of procedural steps in the communication system according to a first modification.

Here, FIG. 10 is a flowchart illustrating of a succession of procedural steps performed in the communication system 100 in the first modification.

As illustrated in FIG. 10, at the beginning, the base station 1 and the terminals 2 carry out a series of processing (i.e., measurement of reception quality) (steps S1 through S6) the same as the first embodiment detailed with reference to FIG. 8.

Next, the base station 1 selects at least one terminal 2 that is to serve as the terminal 2-2 among terminals 2 currently in the wireless area 50 that the base station 1 provides and instructs the selected terminal 2-2 to store new data destined for another terminal 2-1 (step S45).

On the basis of the reception quality information obtained in the steps S1 through S6, the base station 1 determines encoding schemes, modulation schemes, transmission electric powers, and scheduling (data allocation) of data to be transmitted to respective terminals 2 (step S7).

Next, the base station 1 stores new data destined for the terminal 2-1 in a wireless frame and transmits the wireless frame to the respective terminals (step S46).

The terminal 2-1 selectively receives new data destined for the own terminal 2-1 from the wireless frame received from the base station 1 (step S9), and carries out decoding and error detection on the received new data (steps S11 and S50).

As a result of the error detection, if no error is detected in the received new data destined for the own terminal 2-1 (No route in step S50), the terminal 2-1 transmits an ACK signal to the base station 1 (step S51).

In contrast, if an error is detected in the received new data destined for the own terminal as a result of the error detection (YES route in step S50), the terminal 2-1 stores the received data (step S15) and transmits a NACK signal to the base station 1 (step S17).

In the meantime, the terminal 2-2 selectively receives the new data destined for the other terminal 2-1 from the received wireless frame (step S47) in obedience to the instruction from the base station 1 (step S45).

Namely, even when the wireless frame does not include data destined for the own terminal 2-2, the terminal 2-2 assigned by the base station 1 selectively receives the new data destined for the other terminal 2-1 on the basis of the control information of the wireless frame.

Then, the terminal 2-2 judges, on the basis of the transmitting rate (e.g., MCS) of the new data destined for the other terminal 2-1 that the terminal 2-2 receives, whether the reception quality of the other terminal 2-1 is the predetermined threshold or lower (step S48).

If the judgment concludes that the reception quality of the other terminal 2-1 is higher than the predetermined threshold (NO route in step S48), the terminal 2-2 discards the received new data destined for the other terminal 2-1 (step S49). Conversely, if the judgment concludes that the reception quality of the other terminal 2-1 is the predetermined threshold or lower (YES route in step S48), the terminal 2-2 retains the received new data destined for the other terminal 2-1 (step S16).

The combination of the above steps S48 and S49 ensures that the communication control of the first modification is carried out when the terminal 2-2 is positioned in the vicinity of the base station 1 while the terminal 2-1 is positioned within and in the vicinity of the boundary of the wireless area 50 that the base station 1 provides.

Upon receipt of the NACK signal from the terminal 2-1 (step S52), the base station 1 selects a terminal 2-2 having reception quality higher than that of the terminal 2-1 by the predetermined threshold T from the terminals 2 assigned in step S45 (step S53).

Next, on the basis of the reception quality information received from the respective terminals 2, the base station 1 judges whether such a terminal 2-2 satisfying the condition of step S53 is selectable (i.e., judges the presence of such a terminal 2-2) (step S21).

As a result of the judgment, if a terminal 2-2 satisfying the condition cannot be selected (NO route in step S21), the base station 1 carries out normal retransmission processing (e.g., HARQ) (step S22).

Conversely, if a terminal 2-2 satisfying the condition can be selected (YES route in step S21) as the result of the judgment, the base station 1 determines the transmission electric power allocated to the nest new data destined for the terminal 2-2 (step S23).

In addition, the base station 1 determines the MCS to be applied to the next new data destined for the terminal 2-2 on the basis of the reception quality of the terminal 2-2 (step S24).

Here, the base station 1 may determine the transmission electric power of the new data destined for the terminal 2-2 on the basis of a factor obtained by subtracting T from the transmission electric power of the retransmission data destined for the terminal 2-1. Similarly, the base station 1 may determine the MCS of the next new data destined for the terminal 2-2 on the basis of a factor obtained by subtracting T from the reception quality of new data destined for the terminal 2-2. The base station 1 creates the multiplexed data (synthesized data) by synthesizing the retransmission data destined for the terminal 2-1 and the next new data destined for the terminal 2-2 (step S25) and transmits the multiplexed data to the respective terminals (step S26).

Upon receipt of the multiplexed data from the base station 1 (step S27), the terminal 2-1 carries out retransmission synthesis on the multiplexed data and the new data destined for the own terminal 2-1 which has previously received, decodes the data that the own terminal 2-1 desires (step S29), and detects the presence or the absence of an error in the decoded data (step S34).

If the detection finds an error in the decoded data (YES route in step S34), the terminal 2-1 transmits a NACK signal to the base station 1 while, if the detection finds no error in the decoded data (NO route in step S34), the terminal 2-1 transmits an ACK signal to the base station 1.

In the meantime, upon receipt of the multiplexed data from the base station 1 (step S28), the terminal 2-2 creates the retransmission data component destined for the terminal 2-1 included in the received multiplexed data on the basis of the new data destined for the other terminal 2-1 that the terminal 2-2 has previously received and the multiplexed data, and decodes the retransmission data (step S54). This step is performed because, in some retransmission control schemes that the communication system 100 may adopt, the new data and retransmission data may not be the same as described above.

The terminal 2-2 re-modulates the transmission data components destined for the terminal 2-1 generated and decoded instep S54 on the basis of the control information of the wireless frame, and thereby generates a replica corresponding to the retransmission data destined for the terminal 2-1 included in the multiplexed data (step S31).

Then the terminal 2-2 removes the replica generated in step S31 from the multiplexed data received from the base station 1 (through, for example, vector subtraction) (step S32), thereby extracts the next new data destined for the own terminal 2-2 from the multiplexed data, decodes the extracted data (step S33), and detects the presence or the absence of an error in the decoded error (step S35).

If the detection finds an error in the decoded data (YES route in step S35), the terminal 2-2 transmits a NACK signal to the base station 1 while, if the detection finds no error in the decoded data (NO route in step S35), the terminal 2-2 transmits an ACK signal to the base station 1.

The base station 1 then receives an ACK or NACK signal from each terminal 2 (step S36) and judges whether the signal received from all the terminals 2 are ACK signals (step S37).

Here, if all the response signals from the terminals 2 are ACK signals (YES route in step S37), the base station 1 terminates the procedure of the retransmission control processing of the first modification (step S39).

On the other hand, if the response signals from the terminals 2 include a NACK signal (No route in step S37), the base station 1 moves the procedure to sequence A (step S38) detailed above by referring to FIG. 9.

As described above, since the terminal 2-2 previously assigned by the base station 1 selects and retains data destined for another terminal 2-1 from the wireless frame received from the base station 1 in the first modification, the terminal 2-2 can retain the data destined for the terminal 2-1 even when the received wireless data does not include data destined for the own terminal 2-2. Consequently, the communication control can be more flexibly carried out, also ensuring the effects of the first embodiment.

Since the first modification determines data destined for the other terminal 2-1 the terminal 2-2 retains to be data destined for the other terminal 2-1 having a reception quality of the predetermined threshold or lower, it is possible to reduce the processing load on the terminal 2-2.

Furthermore, since, in the first modification, the terminal 2-2 can generate the correct replica of the retransmission data component destined for the other terminal 2-1 included in the multiplexed data even when the new data and the transmission data are not the same, the terminal 2-2 can correctly receive the data destined for the own terminal 2-2.

(3) Second Modification:

Alternatively, the base station 1 may select a terminal 2 having a reception quality higher than that of the terminal 2-1 by a predetermined threshold T or more as the terminal 2-2, which is to be instructed to retain the data to be retained (i.e., data destined for the other terminal 2-1) and is the terminal 2-2 retaining data destined for the other terminal 2-1 as performed in the second modification.

Figure 11:
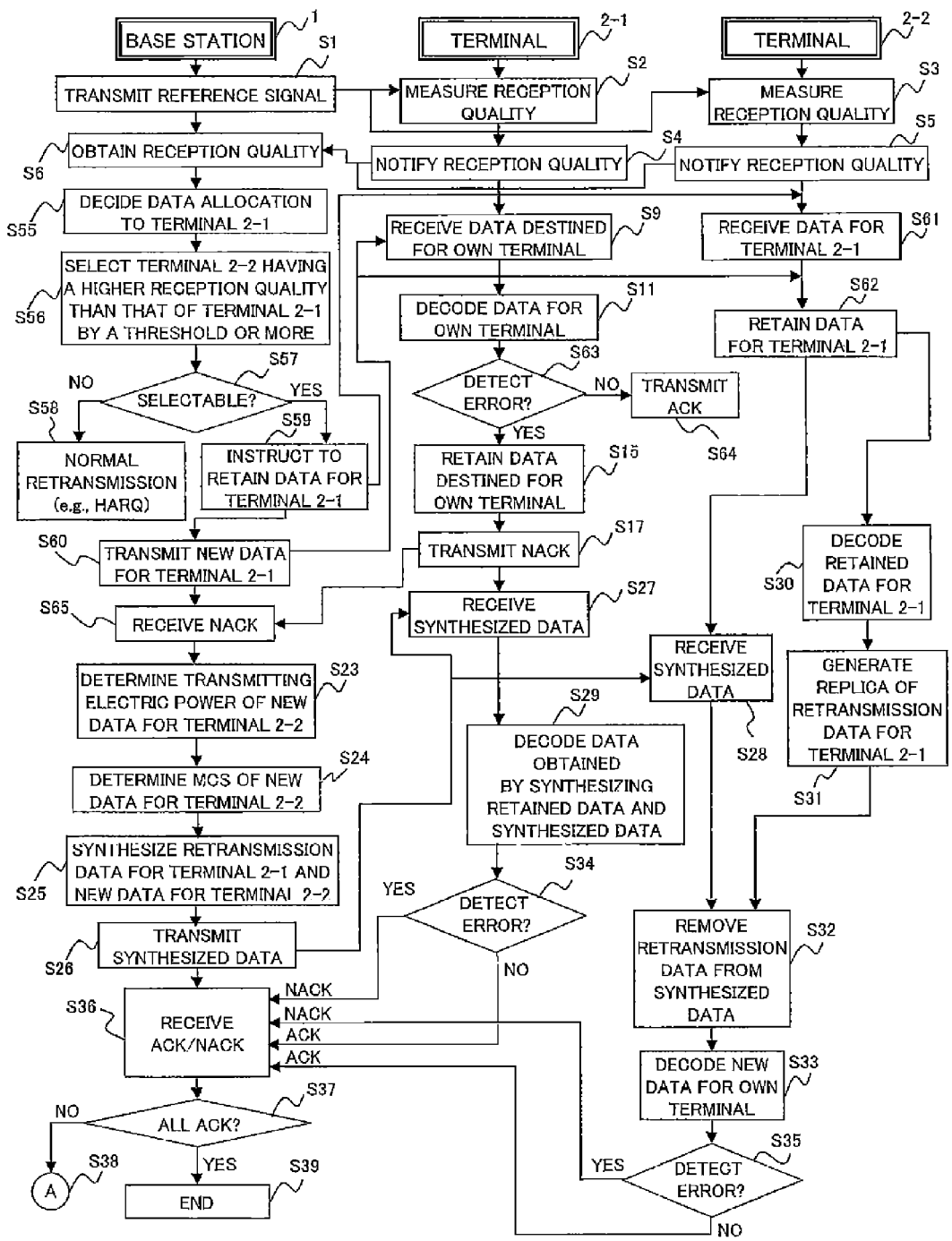
FIG. 11 is a flow chart illustrating a succession of procedural steps in the communication system according to a second modification.

Here, FIG. 11 is a flowchart illustrating of a succession of procedural steps performed in the communication system 100 in the second modification.

As illustrated in FIG. 11, at the beginning, the base station 1 and the terminals 2 carry out a series of processing (i.e., measurement of reception quality) (steps S1 through S6) the same as the first embodiment described by referring to FIGS. 8 and 10.

Next, on the basis of the reception quality information notified from the respective terminals 2, the base station 1 determines data allocation (scheduling) to the terminal 2-1 (step S55).

Then the base station 1 selects a terminal 2 having a reception quality higher than that of the terminal 2-1 by the predetermined threshold T or more as the terminal 2-2 from the terminals 2 currently in the wireless area 50 that the base station 1 itself provides (step S56).

In succession, on the basis of the reception quality information received from the respective terminals 2, the base station 1 judges whether such a terminal 2-2 satisfying the condition of step S56 is selectable (i.e., judges the presence of such a terminal 2-2) (step S57).

As a result of the judgment, if a terminal 2-2 satisfying the condition cannot be selected (NO route in step S57), the base station 1 carries out normal retransmission processing (e.g., HARQ) (step S58).

Conversely, as a result of the judgment, if a terminal 2-2 satisfying the condition can be selected (YES route in step S57), the base station 1 instructs the selected terminal 2-2 to retain data destined for the terminal 2-1 (step S59).

Next, the base station 1 transmits a wireless frame included data destined for the terminal 2-1 to the respective terminals 2 (step S60).

The terminal 2-1 selectively receives new data destined for the own terminal 2-1 from the wireless frame received from the base station 1 (step S9), and carries out decoding and error detection on the received new data (steps S11 and S63).

As a result of the error detection, if no error is detected in the received new data destined for the own terminal 2-1 (No route in step S63), the terminal 2-1 transmits an ACK signal to the base station 1 (step S64).

In contrast, if an error is detected in the received new data destined for the own terminal 2-1 as a result of the error detection (YES route in step S63), the terminal 2-1 stores the received data in question (step S15) and transmits a NACK signal to the base station 1 (step S17).

In the meantime, the terminal 2-2 selectively receives the new data destined for the other terminal 2-1 from the received wireless frame (step S61) in obedience to the instruction from the base station 1 (step S59).

The subsequent process is identical to that described above with reference to FIGS. 8 and 9.

As described above, in the second modification, the base station 1 selects a terminal 2-2 having a reception quality higher than that of the terminal 2-1 by a predetermined threshold T or more as the terminal 2-2, which is to be instructed to retain the data to be retained (i.e., data destined for the other terminal 2-1) and is the terminal 2-2 retaining data destined for the other terminal 2-1.

This can improve efficiency in using data, also ensuring the same effects as the above embodiment and modification, and concurrently can further reduce the load on the respective terminals 2.

(4) Others:

The configurations and the procedural steps of the base station 1 and the respective terminals may be selected, unselected, or combined according to requirement.

For example, the base station 1 may have a function as a communication terminal that receives data from terminals 2 and is capable of issuing, to each terminal 2, a request for retransmitting the data, in addition to the function as the communication station that transmits data to the terminals 2.

Furthermore, each terminal 2 may have a function of a communication station that transmits data to the base station 1 in addition to the function as a communication terminal that receives data from the base station 1 and is capable of issuing, to the base station 1, a request for retransmitting the data to the terminal 2.

Further, in the foregoing embodiments and modifications, data communication is carried out in a communication system including two terminals 2. Alternatively, the communication system may accommodate three or more terminals 2, which may have difference distances from the base station 1 or to which the base station 1 may allocate different transmission electric powers.

Data included in multiplexed data should by no means be limited to those of the above examples. Alternatively, retransmission data destined for the terminal 2-1 and retransmission data destined for the terminal 2-2 maybe multiplexed in multiplexed data; and retransmission data destined for the terminal 2-2 and new data destined for the terminal 2-1 may be multiplexed in multiplexed data. Furthermore, new data or retransmission data of three or more terminals 2 may be multiplexed in multiplexed data. In this case, each terminal 2 can correctly decode data destined for the own terminal 2 by removing replica of data destined for other terminals 2 stored previously from the multiplexed data, or synthesizing new data destined for the own terminal 2 previously retained and the multiplexed data, which is followed by decoding the synthesized data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A communication system comprising:
a communication station that transmits data; and
a plurality of communication terminals each of which receives the data from the communication station and is capable of sending the communication station a request for retransmitting the data,
the communication station comprising
a synthesizer that, if the communication station receives the request for retransmitting first data from a first communication terminal that is one of the plurality of communication terminals, synthesizes second data as retransmission data of the first data and third data to thereby create synthesized data, the second data being destined for the first communication terminal, the third data being destined for a second communication terminal that is another one of the plurality of communication terminals, and
a transmitter that transmits the synthesized data created by the synthesizer using a single communication resource,
the second communication terminal comprising
a memory that stores the first data, and
a decoder that receives the synthesized data from the communication station and decodes the third data based on the synthesized data and the first data stored in the memory.

2. The communication system according to claim 1, wherein the synthesizer creates the synthesized data through vector synthesis on the retransmission data and the third data.

3. The communication system according to claim 1, wherein the first communication terminal comprises:
a memory that stores the first data, and
a decoder that receives the synthesized data from the communication station and decodes desired data through retransmission synthesis on the synthesized data and the first data stored in the memory.

4. The communication system according to claim 1, wherein the decoder in the second communication terminal decodes the third data by creating, based on the first data stored in the memory, replica data corresponding to the retransmission data included in the synthesized data and removing the replica data from the synthesized data.

5. The communication system according to claim 1, wherein the second communication terminal has a second reception quality higher than a first reception quality of the first communication terminal.

6. The communication system according to claim 1, wherein a first transmission electric power allocated to the retransmission data included in the synthesized data is set to be larger than a second transmission electric power allocated to the third data included in the synthesized data.

7. The communication system according to claim 1, wherein
the communication station instructs, before the communication station transmits data destined for the first communication terminal, the second communication terminal to receive and store the data destined for the first communication terminal from the communication station, and
the second terminal stores the data destined for the first communication terminal in response to the instruction from the communication station.

8. The communication system according to claim 1, wherein the communication station allocates, to the third data included in the synthesized data, a second transmission electric power lower than a first transmission electric power to be allocated to the retransmission data included in the synthesized data by a predetermined level.

9. The communication system according to claim 8, wherein the predetermined level is based on at least one of: a possible noise signal at each of the plurality of communication terminals; a propagation loss on a transmission path between the communication station and each of the plurality of communication terminals; an propagation environment between the communication station and each of the plurality of communication terminals; and a reception quality of each of the plurality of communication terminals.

10. A communication station used in a communication system comprising the communication station that transmits data and a plurality of communication terminals each of which receives the data from the communication station and is capable of sending the communication station a request for retransmitting the data, the communication station comprising:
a synthesizer that, if the communication station receives the request from a first communication terminal that is one of the plurality of communication terminals, synthesizes retransmission data destined for the first communication terminal and data destined for a second communication terminal that is another one of the plurality of communication terminals to thereby create synthesized data;
a controller that allocates, to the data destined for the second terminal included in the synthesized data, a second transmission electric power lower than a first transmission electric power to be allocated to the retransmission data included in the synthesized data by a predetermined level; and
a transmitter that transmits the synthesized data created by the synthesizer using a single communication resource.

11. The communication station according to claim 10, wherein the synthesizer creates the synthesized data through vector synthesis on the retransmission data and the data destined for the second communication terminal.

12. A method for communication in a communication system including a communication station that transmits data; and a plurality of communication terminals each of which receives the data from the communication station and is capable of sending the communication station a request for retransmitting the data, the method comprising:
upon receipt of the request from a first communication terminal that is one of the plurality of communication terminals,
synthesizing retransmission data destined for the first communication terminal and data destined for a second communication terminal that is another one of the plurality of communication terminals to thereby create synthesized data;
allocating, to the data destined for the second terminal included in the synthesized data, a second transmission electric power lower than a first transmission electric power to be allocated to the retransmission data included in the synthesized data by a predetermined level; and
transmitting the synthesized data using a single communication resource.

13. A method for communication in a communication system including a communication station that transmits data; and a plurality of communication terminals each of which receives the data from the communication station and is capable of sending the communication station a request for retransmitting the data, the method comprising:
storing first data for which the request is sent;
receiving synthesized data created by the communication station through synthesizing second data as retransmission data of the first data and third data, the second data being destined for a first communication terminal that is one of the plurality of the communication terminals, the third data being destined for a second communication terminal that is another one of the plurality of communication terminals; and
decoding the third data based on the synthesized data and the first data stored in the memory.

* * * * *